United States Patent [19]

Kelly et al.

[11] 4,385,379
[45] May 24, 1983

[54] DIGITAL CONCENTRATOR FOR USE WITH A DIGITAL TELEPHONE OFFICE

[75] Inventors: Michael J. Kelly, Scottsdale; Robert L. Lindsay, Phoenix, both of Ariz.; Alex W. Kobylar, Chicago; David J. Stelte, Wheaton, both of Ill.

[73] Assignee: GTE Automatic Electric Labs Inc., Northlake, Ill.

[21] Appl. No.: 289,954

[22] Filed: Aug. 5, 1981

Related U.S. Application Data

[63] Continuation-in-part of Ser. No. 105,436, Dec. 19, 1979, abandoned.

[30] Foreign Application Priority Data

Oct. 31, 1980 [BE] Belgium ............................... 2/58836
Dec. 12, 1980 [CA] Canada ............................... 366,696-4
Feb. 5, 1981 [IT] Italy ................................. 19530 A/81

[51] Int. Cl.³ .......................................... H04Q 11/04
[52] U.S. Cl. .......................................... 370/56; 370/67
[58] Field of Search ................. 179/18 FC; 370/56, 67

[56] References Cited

U.S. PATENT DOCUMENTS 3,924,077 12/1975 Blakeslee ......................... 370/56 X
4,232,386 11/1980 McDonald et al. ................. 370/68
4,286,119  8/1981 Stelte et al. ..................... 179/18 FC

OTHER PUBLICATIONS

"Study of a Rural Digital End Office", by M. J. Kelly, *GTE Automatic Electric Journal*, May 1977, pp. 294-302.
"Two Terminals for DMS-1", by B. Klodt, *Telesis* (Canada), Aug. 1977, pp. 107-112.

*Primary Examiner*—Thomas W. Brown
*Attorney, Agent, or Firm*—Robert J. Black; Gregory Hendricks

[57] ABSTRACT

Signals from line circuits requesting service are transferred to a T1 channel via a Pulse Amplitude Modulated (PAM) bus. The number of line circuits which can be served by a T1 line is not limited by the capacity of the T1 line since the probability of all line circuits requesting service at the same time is extremely low. A processing unit detects requests for service and assigns them a slot in a memory which defines the scanning sequence for insertion of line circuit signals in the T1 channel.

6 Claims, 23 Drawing Figures

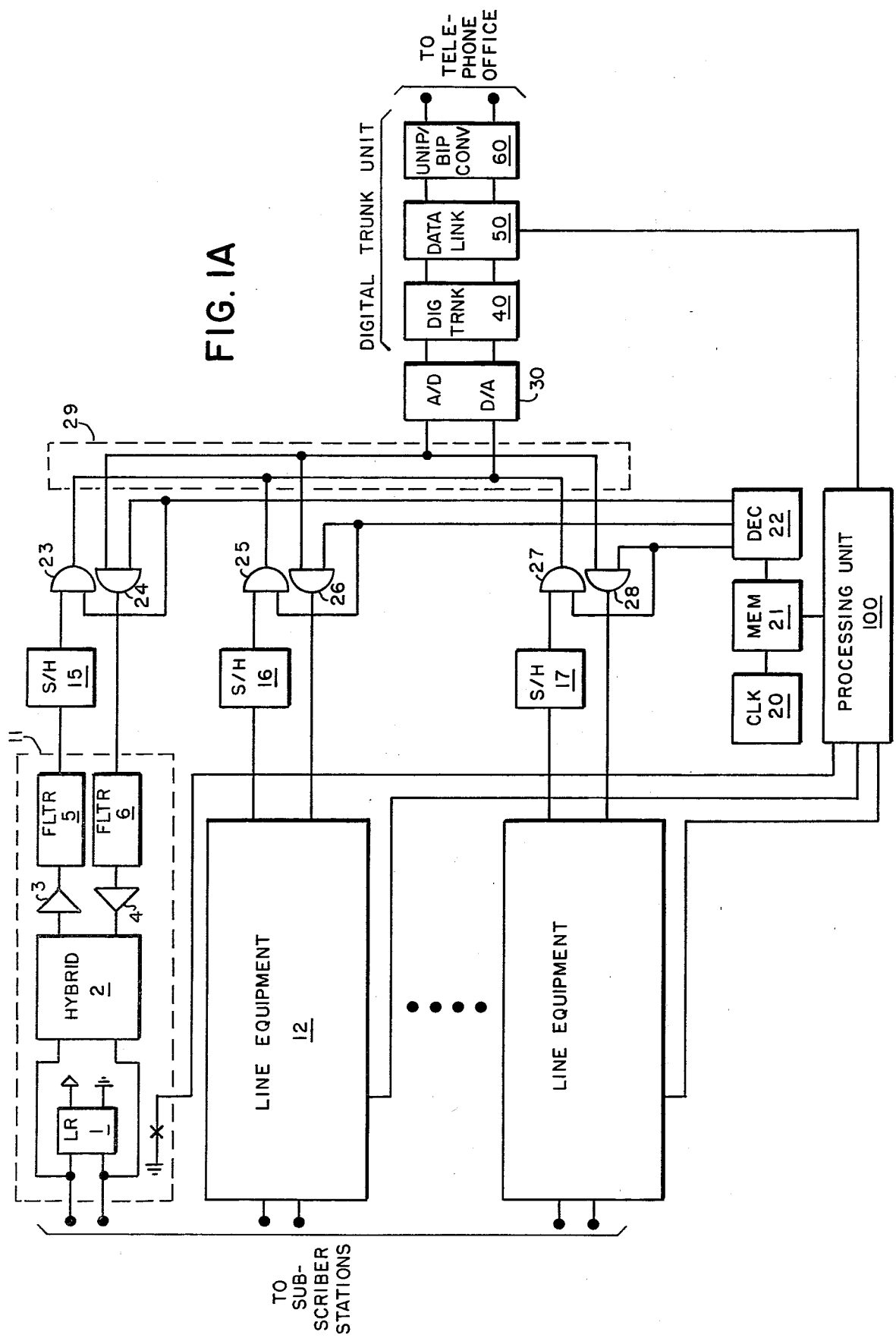

DIGITAL CONCENTRATOR FOR USE WITH A DIGITAL TELEPHONE OFFICE

This application is a continuation-in-part of our application Ser. No. 105,436, filed on Dec. 19, 1979 (now abandoned).

BACKGROUND OF THE INVENTION

(1) Field of the Invention

The present invention relates to digital telephone switching and more particularly to a digital concentrator for use with a digital telephone office. The digital concentrator allows the number of subscriber stations connected to a T1 line to exceed the capacity of the T1 line based on the probability of occurrence of simultaneous requests for service. Remote subscriber stations are thus provided with the full range of customer features associated with a digital telephone office. Thus an economical means is provided for connecting remote subscriber stations to a class 5 telephone office.

(2) Description of the Prior Art

Concentration systems are old and well known. Typically they require a concentrator located near the subscriber stations and an expander located in a central office. Such concentrators and expanders are of an analog nature and require one appearance on the output of the expander for each appearance on the input of the concentrator. Thus the connection between these subscriber stations and the telephone office are minimized, but such an arrangement requires the use of an expansion stage. Further, such analog concentration systems are not adaptable to digital telephone offices unless the analog signals from the output of the expansion stage are converted to digital format for use by the digital telephone office.

Accordingly, it is an object of the present invention to provide a digital concentrator which can be connected directly to a digital telephone office without the use of an expansion stage or an analog to digital interface.

SUMMARY OF THE INVENTION

The present invention provides for digital concentration of connections between remote subscriber stations and a T1 channel connected to a digital telephone office. Thus it extends the full range of features of a digital telephone office to rural subscribers by allowing the number of subscriber stations, connected to a T1 line, to exceed the capacity of the T1 line. Based on probability of occurrence of simultaneous requests for service a 4 to 1 concentration stage is practical. Thus 96 subscriber stations can be connected to one T1 line via the digital concentrator.

The digital concentrator includes a Pulse Amplitude Modulated (PAM) bus connected to a plurality of line circuits via associated sample and hold circuits, filter circuits and hybrid circuits. This PAM bus is further connected to a non-linear A/D-D/A converter which converts the PAM signals to Pulse Code Modulated (PCM) signals. A digital trunk interface is connected to the A/D-D/A converter and provides transmission of the PCM signals to an associated digital telephone office. Each sample and hold circuit samples the analog output of an associated filter and extends the sample through it so that the A/D converter has sufficient real time to make the conversion. An analog gate is enabled by a decoder which decoded data from a memory which was loaded by a processing unit. The decoder operates to selectively enable the connection of the various line circuits to the digital trunk interface.

The line circuits are connected to the PAM bus according to the sequence of addresses read from the memory. When a subscriber station goess off-hook, its associated line circuit extends a signal to the processing unit which detects this request for service and communicates the line circuit number to the telephone office via the digital trunk interface. The telephone office responds by transmitting the T1 line channel number to be assigned to this line circuit and the processing unit loads the designated memory slot with the line circuit address. The memory sequentially displays the line circuit addresses which are decoded and used to enable the corresponding line circuit connection to a nonlinear A/D and D/A converter which converts them from PAM format to PCM format. These signals are then transferred to the digital trunk interface which inserts them in the T1 channel data stream and transmits them to an associated digital telephone office.

When the next line circuit address is read out of the memory the decoder again enables signals from the associated subscriber station to be gated to the A/D-D/A converter. Thus each subscriber station which is busy is given a time slot in the sequence defined by the position of its address in the memory during which its signals are transmitted to the telephone office. A clock circuit is used to control the rate at which addresses are read out of the memory and thus also determines the duration of the time period during which each subscriber station is enabled through the PAM bus. The digital trunk interface thus inserts the PCM signals associated with the time slot for each subscriber station in a predetermined position in a T1 line. A T1 line is a repetitive transmission of 193 bits during each 125 microseconds. These 193 bits include a framing bit and 24 signals represented by an 8-bit code of each signal.

Thus 96 subscriber stations are connected to a digital telephone office via a single T1 line and are provided access to a channel on a request for service basis.

DESCRIPTION OF THE DRAWINGS

FIG. 1A is a block diagram of a digital concentrator for use with a digital telephone office in accordance with the present invention;

DESCRIPTION OF THE PREFERRED EMBODIMENT

Figure 1B:
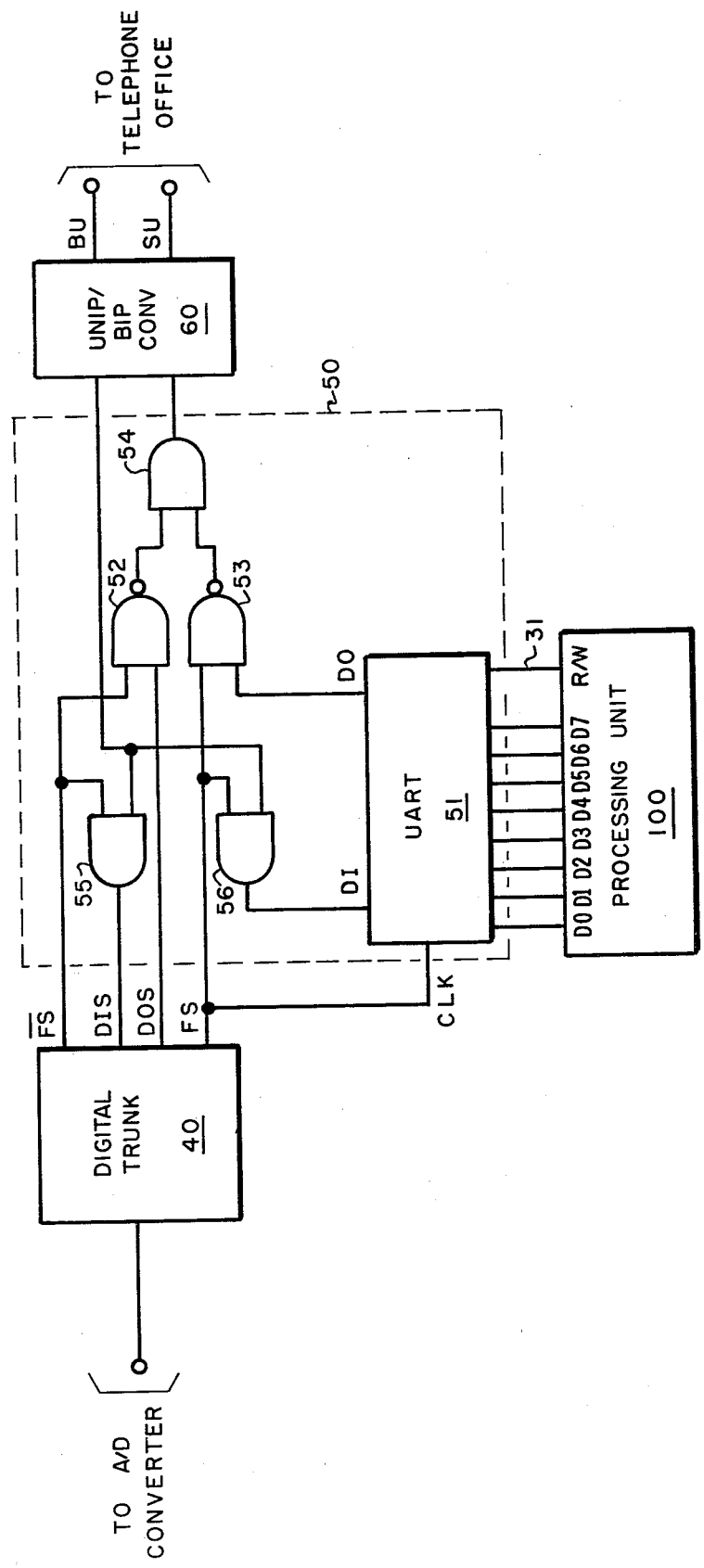
FIG. 1B is a schematic diagram of a Data Link in accordance with the present invention.
Figure 2:
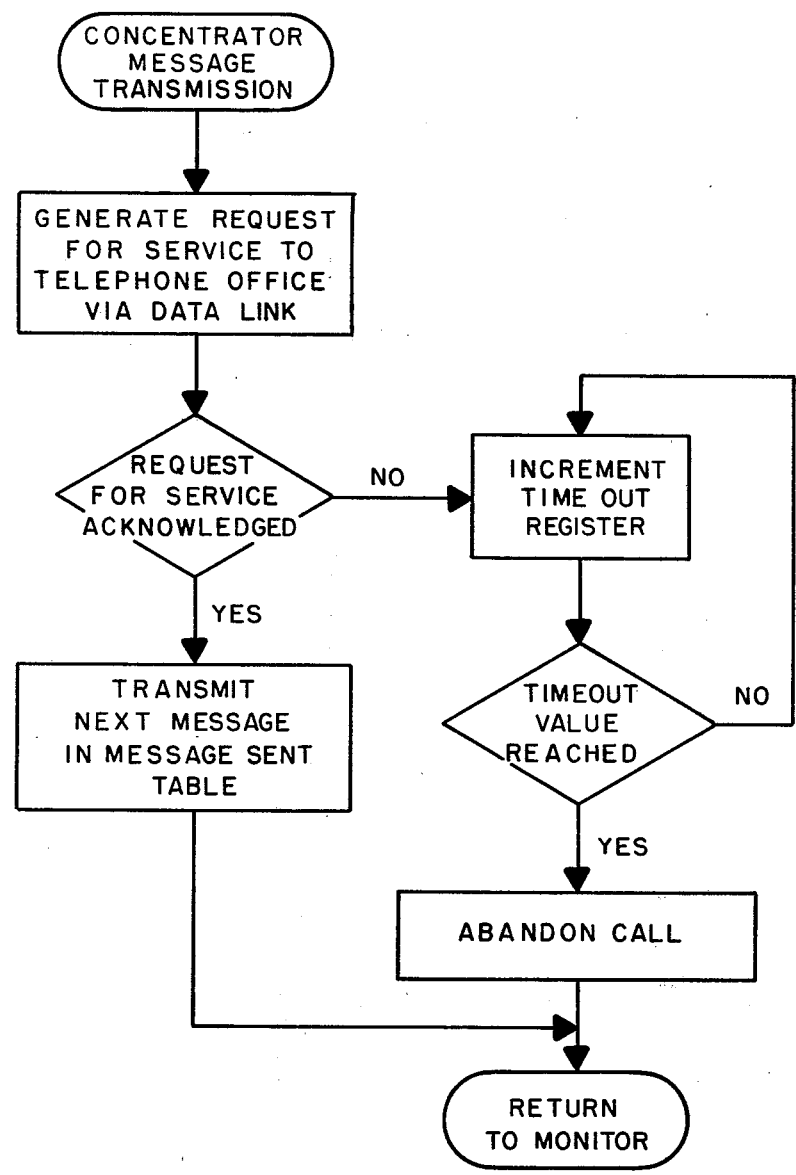
FIGS. 2–9 are flow charts showing the software operations of the Concentrator Processing Unit of FIG. 1.
Figure 3:
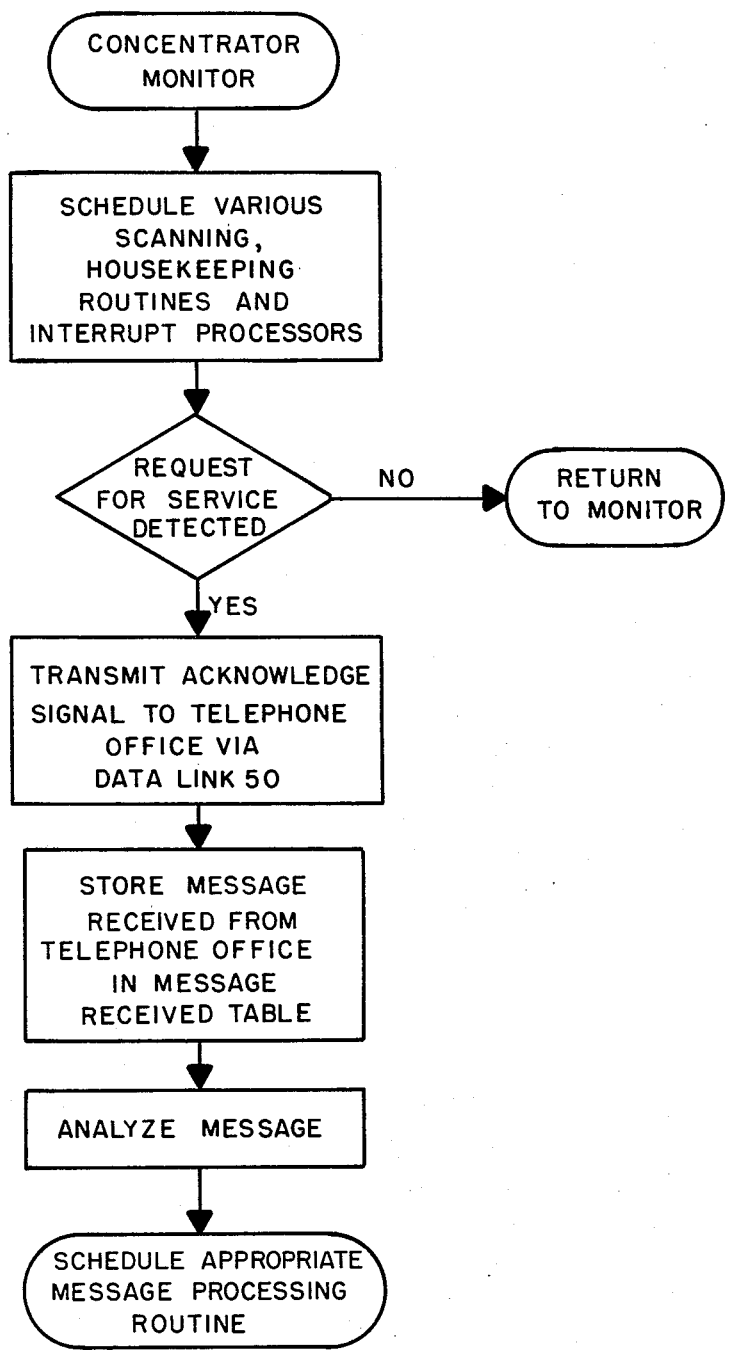
Figure 4:
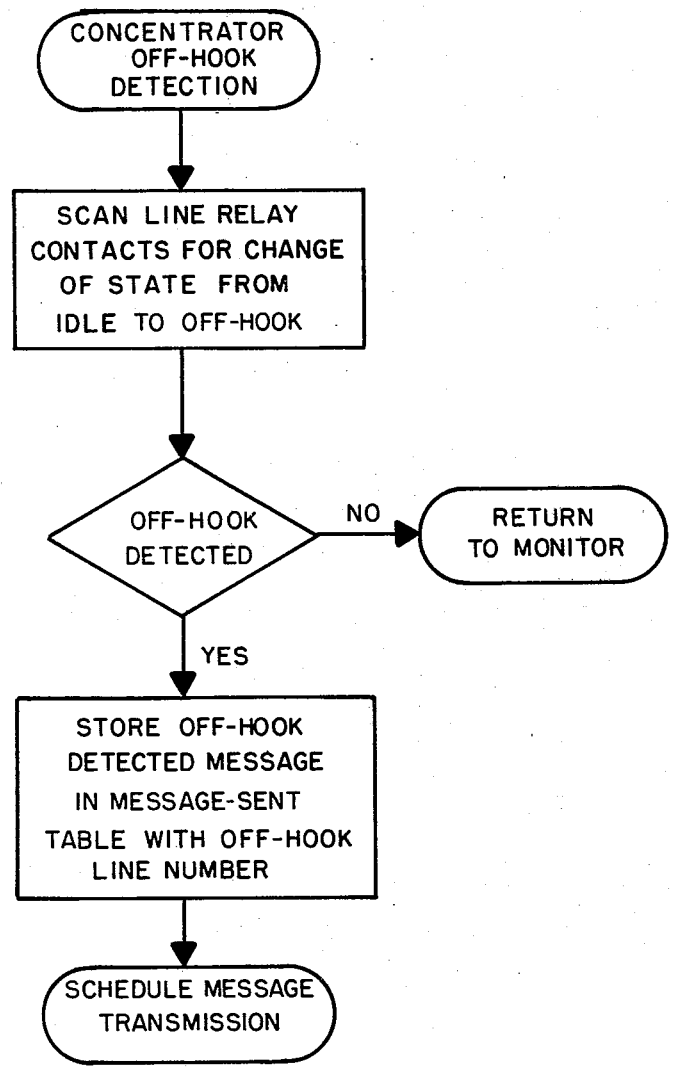
Figure 5:
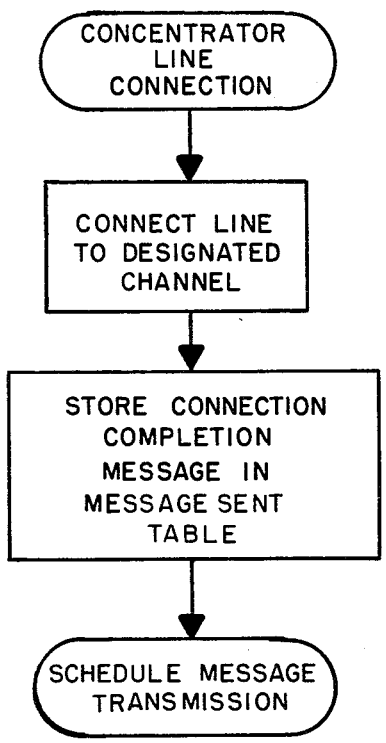
Figure 6:
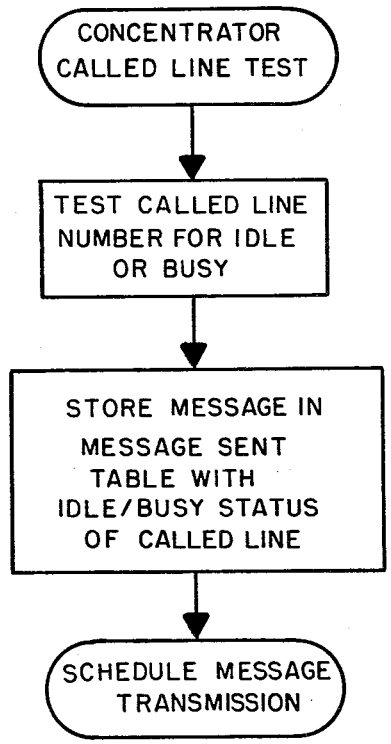
Figure 7:
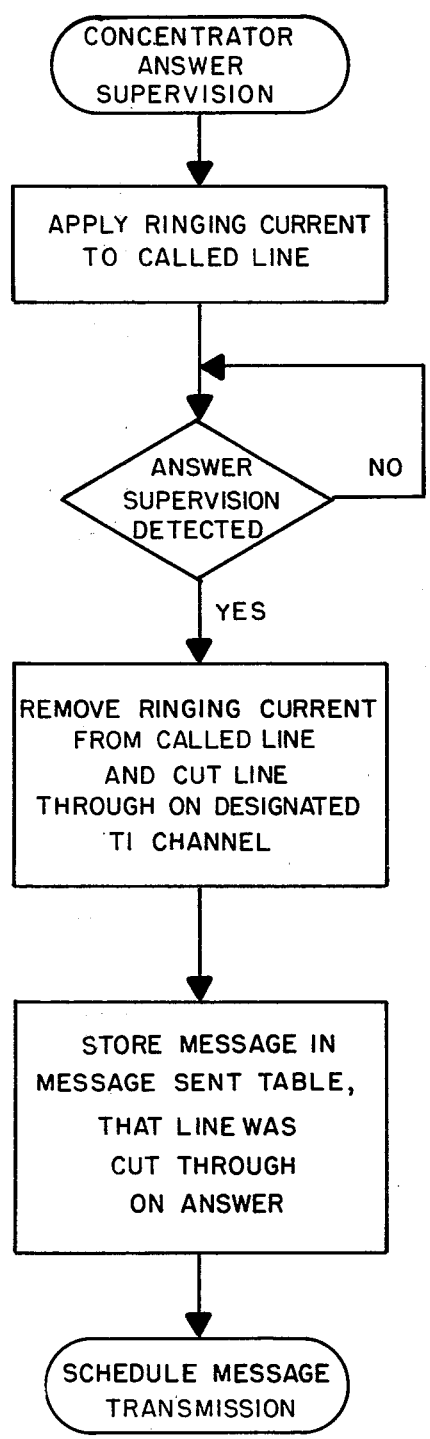
Figure 8:
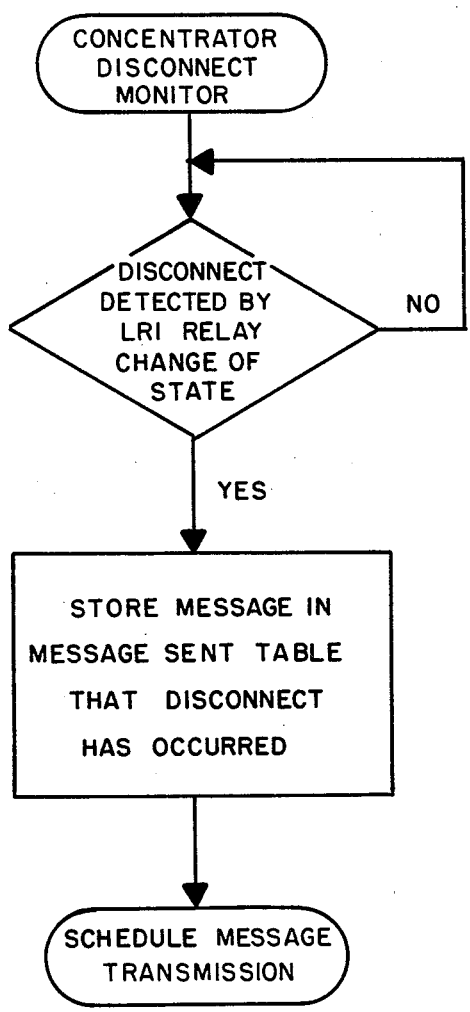
Figure 9:
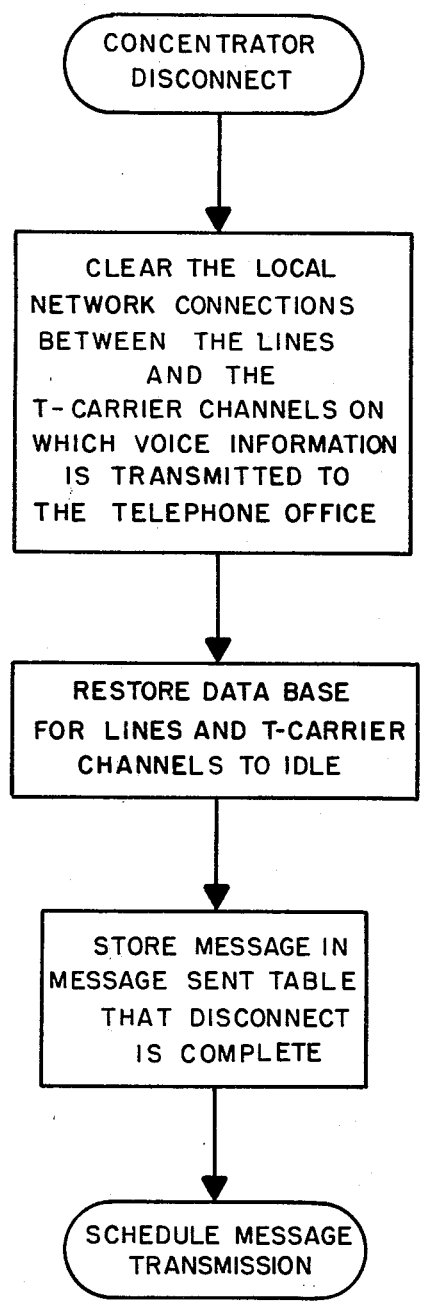
Figure 10:
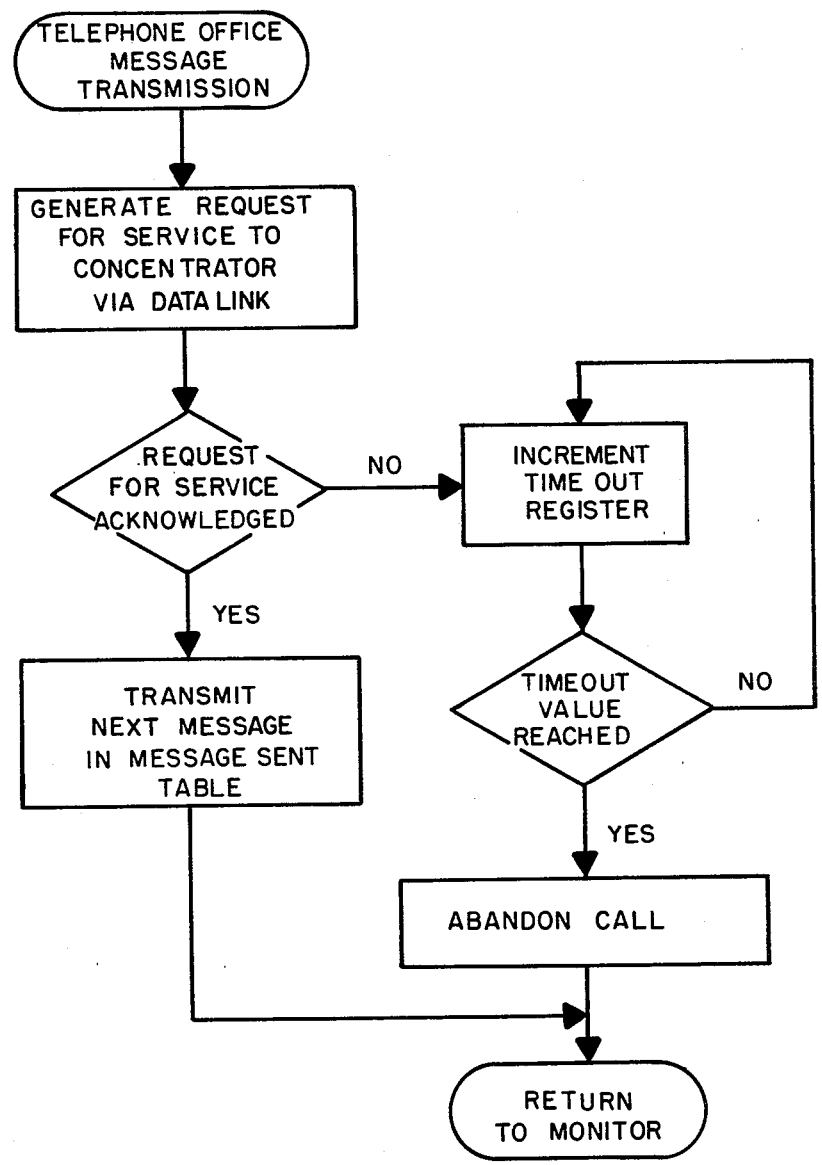
FIGS. 10–22 are flow charts showing the software operations of the Telephone Office of FIG. 1.
Figure 11:
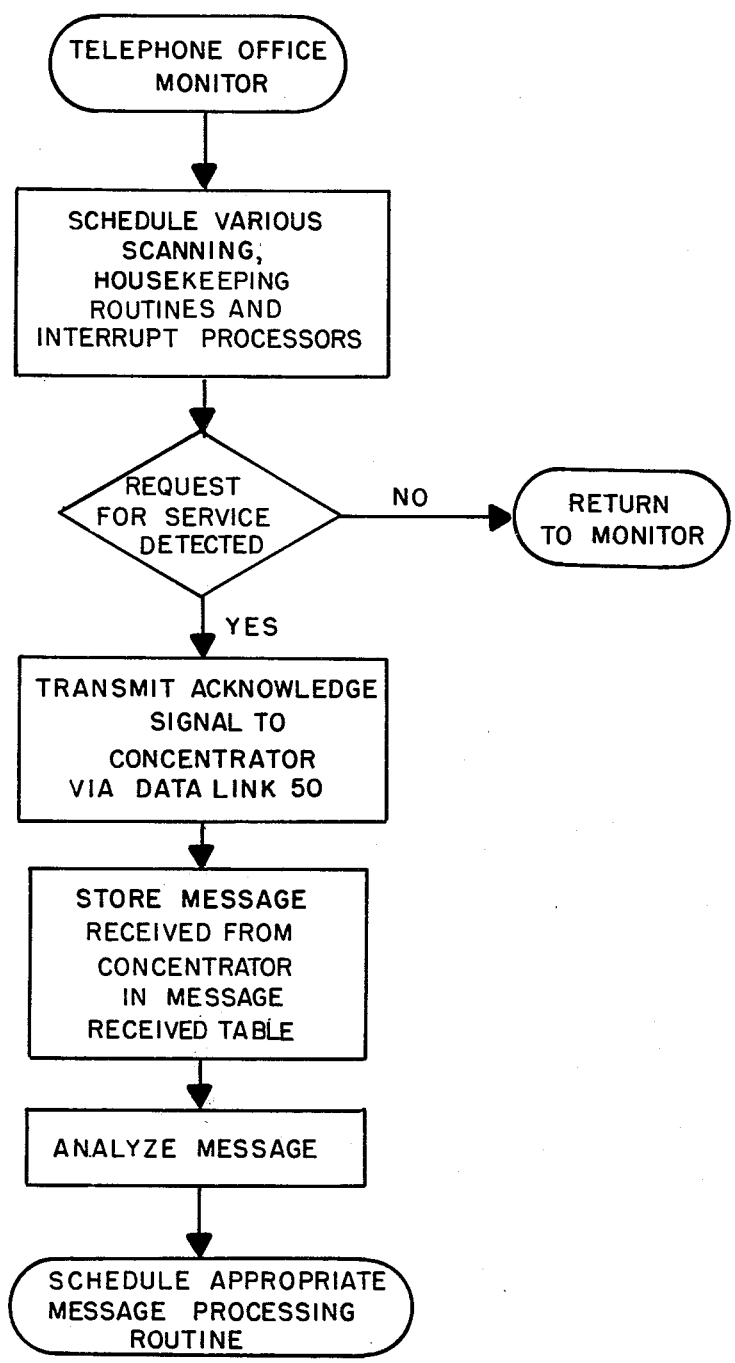
Figure 12:
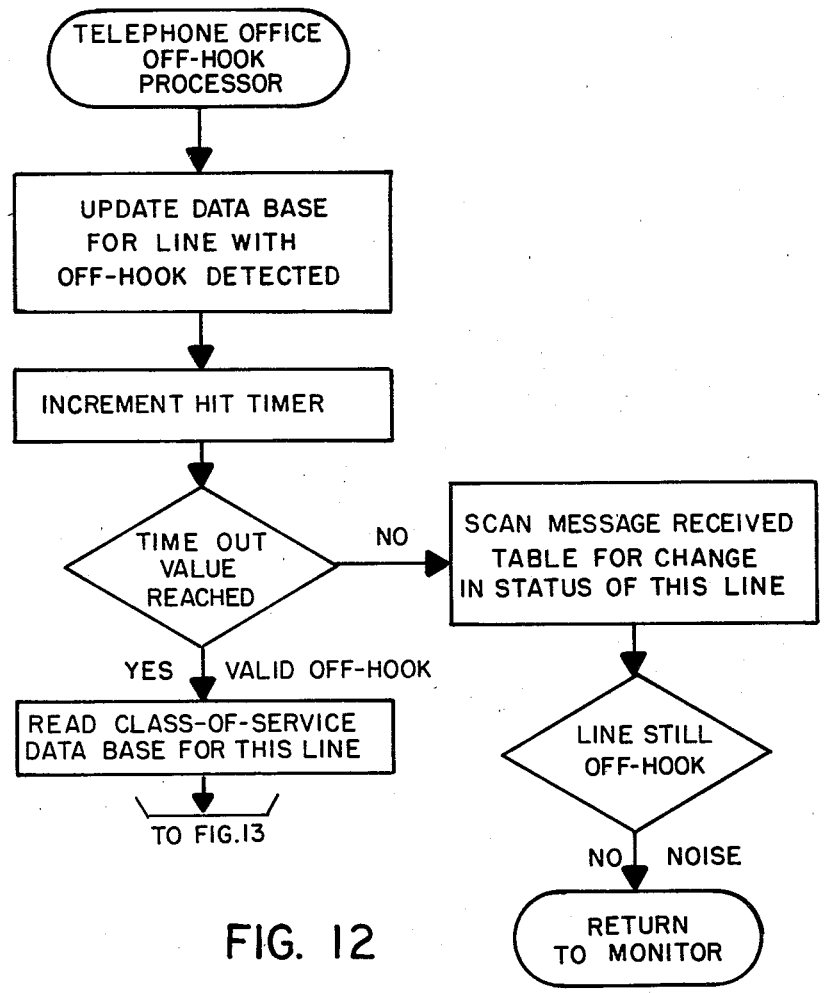
Figure 13:
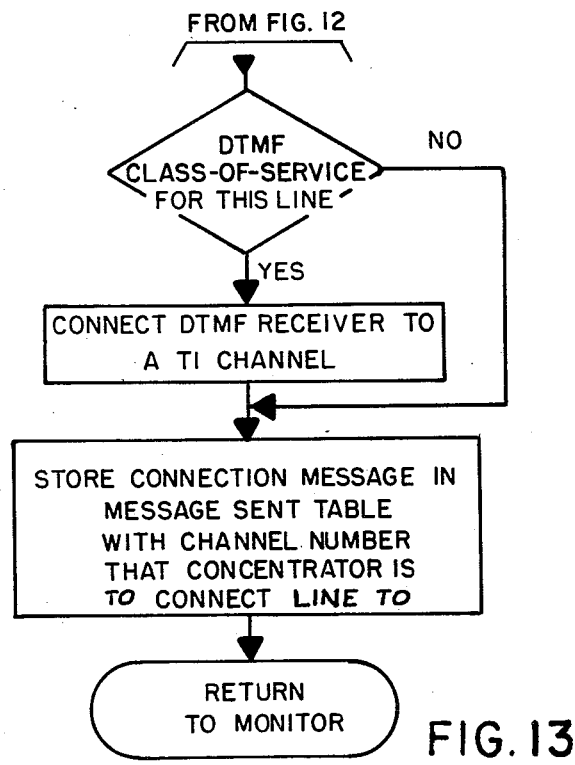
Figure 14:
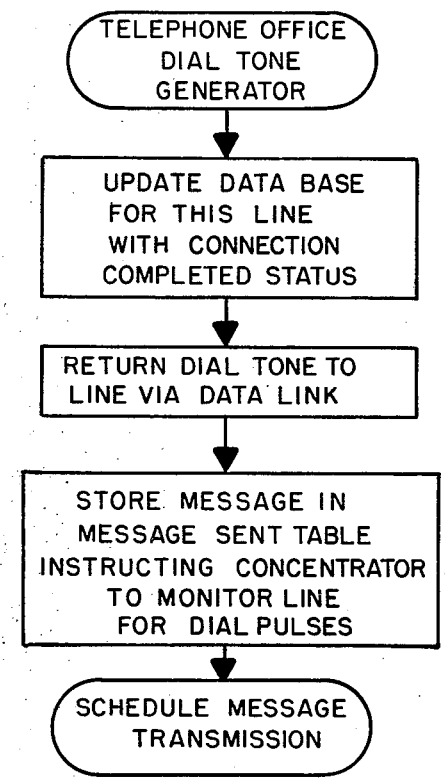
Figure 15:
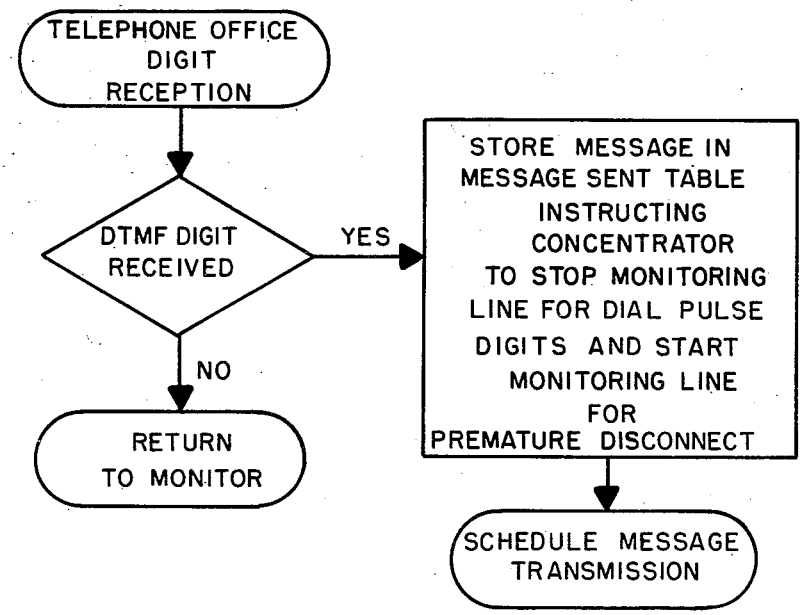
Figure 16:
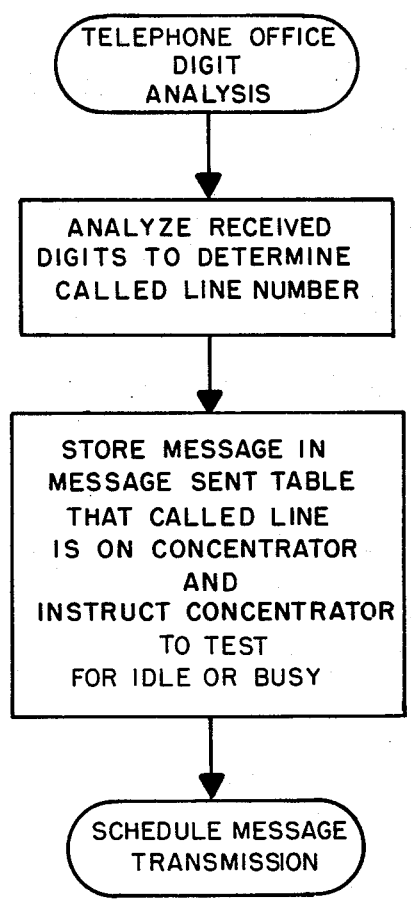
Figure 17:
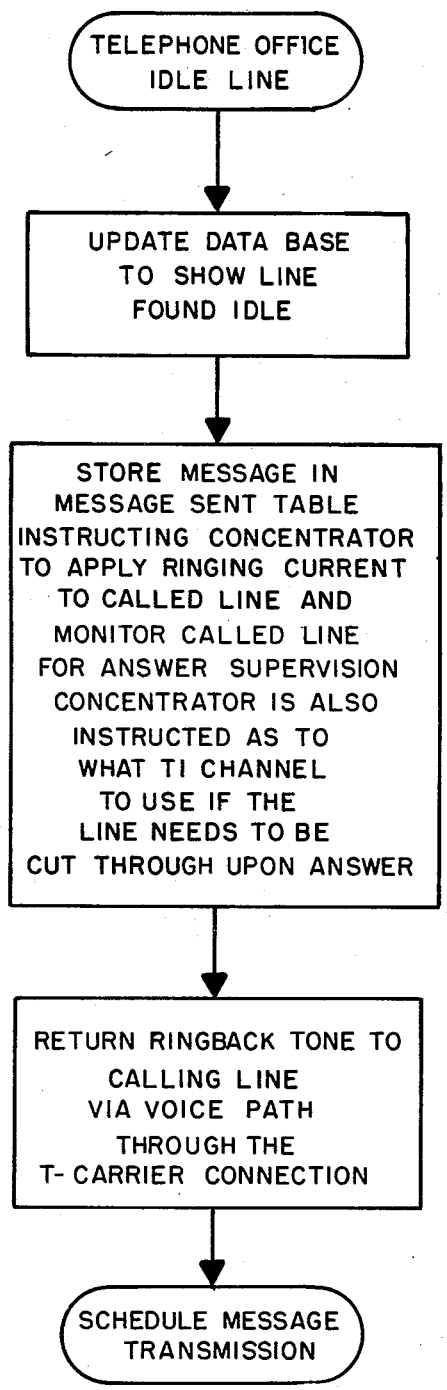
Figure 18:
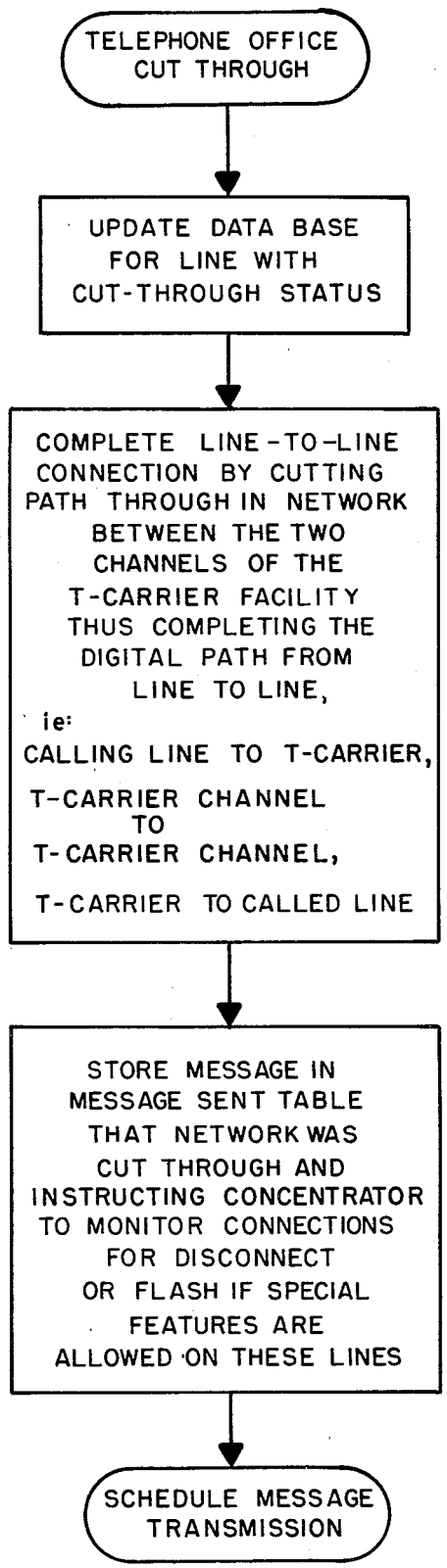
Figure 19:
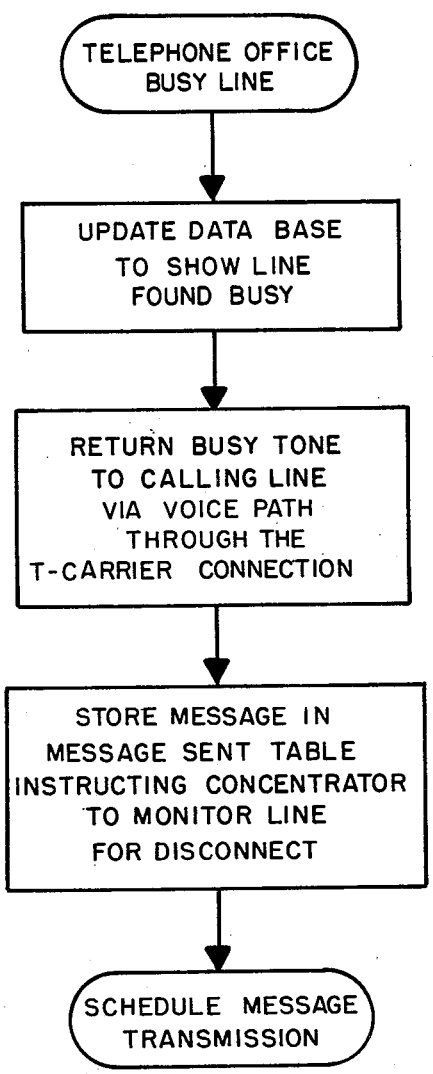
Figure 20:
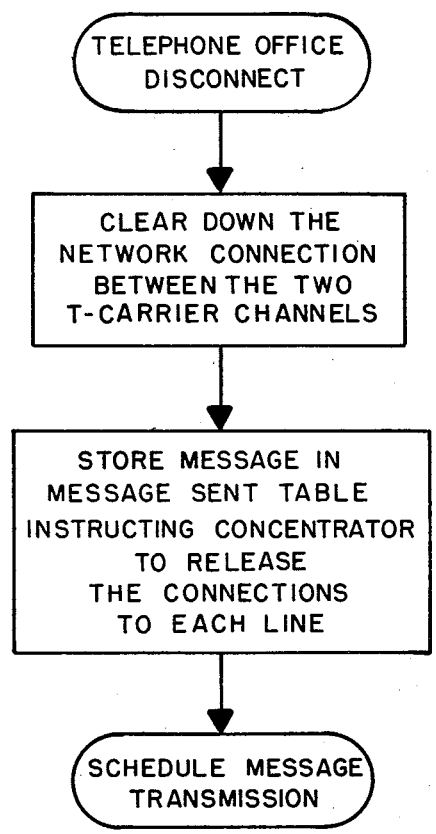
Figure 21:
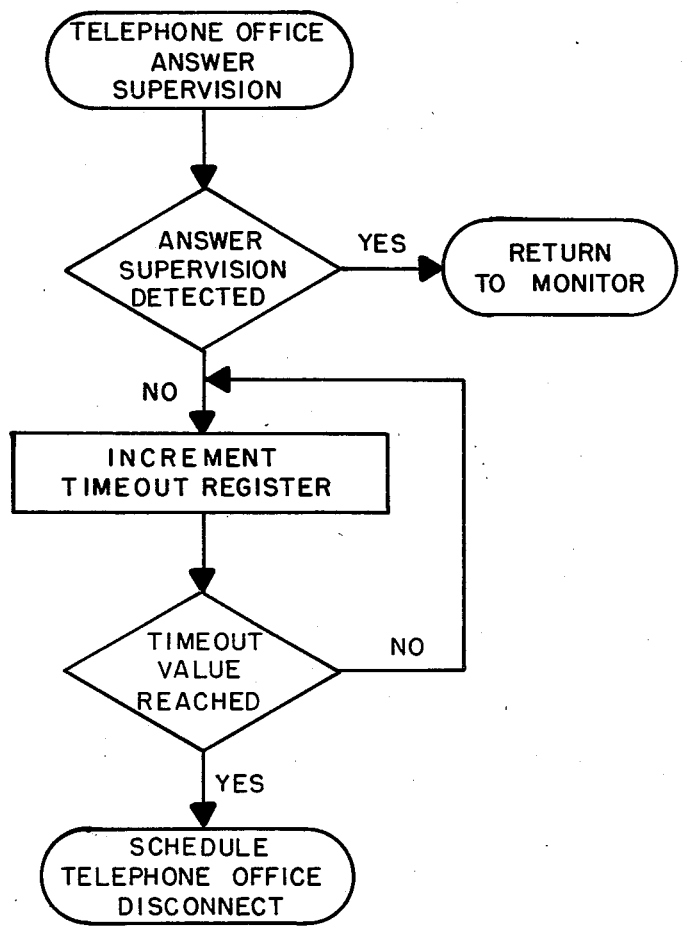
Figure 22:
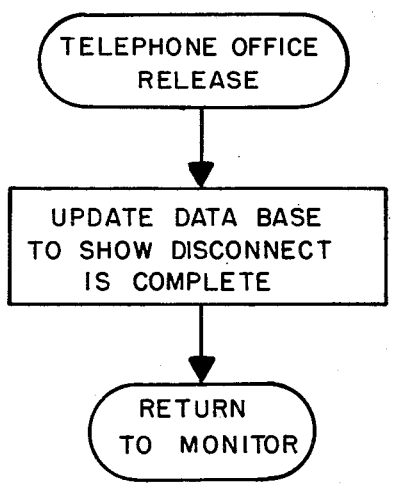

Referring now to FIG. 1A, the digital concentrator of the present invention is shown connected between a plurality of subscriber stations and a digital telephone office. Line circuits are shown connected between associated subscriber stations and their associated sample and hold circuits (15–17) which are connected to analog gate circuits 23, 25, 27. The line circuits are further connected to analog gate circuits 24, 26, 28. Non-linear A/D-D/A converter 30 is shown connected between PAM bus 29 and digital trunk 40. Data link 50 is connected between digital trunk 40 and unipolar/bipolar converter 60 which is connected to an associated digital telephone office. Processing unit 100 is shown connected to data link 50 and the line circuits. Line circuits, sample and hold circuits, analog gate circuits, A/D-D/A converters, digital trunks and unipolar/bipolar converters are well know in the field of digital telephone offices. Data link 50 is a bit stream merging circuit. Such circuits are old and well known and have long been used to merge supervisory data into the supervisory channels of a T1 frame, i.e. the eighth bit of each channel in every 6th frame. Data link 50 can also be a novel circuit which is disclosed in our copending application Ser. No. 323,345, titled, Digital Satellite Telephone Office, which was filed on Nov. 20, 1981. Processing units are also old and well known and any suitable computer, mini-computer or microprocessor can be used.

Processing unit 100 initally detects a request for service from an off-hook subscriber station via its associated line circuit, particularly the make contacts of relay 1. Processing unit 100 then communicates the identity of the off-hook subscriber station to an associated telephone office via data link 50 which sequentially inserts each bit of this communication sequentially into the framing pattern of the T1 line data stream generated by digital trunk 40. Each T1 line data frame includes 193 bits which comprise 24 channels of 8-bits each plus a framing bit. Since the terminal framing bit is only used in every odd numbered frame, the framing bit position is available for supervisory signaling in every even numbered frame and data link 50 inserts the bits transmitted between processing unit 100 and the digital telephone office in that spare framing bit position.

The telephone office responds by transmitting the T1 channel number to be assigned to the off-hook subscriber station. In this manner, the digital telephone office knows which subscriber station is transmitting in which T1 channel and thus there is no need for an expansion stage to provide an appearance for each subscriber station at the telephone office.

Processing unit 100 then loads memory 22 with the address of the off-hook line circuit to be connected to PAM bus 29. Clock 20 then causes the addresses to be read out of memory 21 sequentially and decoder 22 operates to generate an individual enable signal for each sequential address decoded from memory 21. Analog gating circuits 23 through 28 thus become enabled when their connection to decoder 22 is enabled.

For example, when the subscriber station connected to line equipment 11 goes off-hook it extends a loop signal to line circuit 11 which converts it to a 4-wire signal via hybrid 2, amplifies it via amplifier 3 and filters it with filter 5. This signal is then sampled and held by sample and hold circuit 15 which transfers it as sampled to gate circuit 23. However, gate circuit 23 is not enabled until clock circuit 20 causes the address associated with line equipment 11 to be read out of memory 21, and decoded by decoder 22, thus enabling gate circuit 23. Processing unit 100 previously loaded the address of the off-hook line circuit in the memory slot identified by the telephone office. Upon being enabled, gate circuit 23 transfers the signal from line equipment 11 to PAM bus 29. The signal from line circuit 11 thus remains extended via gate circuit 23 and PAM bus 29 to A/D-D/A converter 30 as long as its associated address is decoded by decoder 22.

When clock circuit 20 generates the next clock pulse, memory circuit 21 displays the next sequential line circuit address which is decoded by decoder 22 and thus causes the associated gate circuit to become enabled while gate circuit 23 is disabled. Thus the signal lead from line circuit 11 will no longer be extended to A/D-D/A converter 30 but the signal lead from the next sequentially enabled line circuit will be extended via an associated enabled gate circuit and PAM bus connection 29 to A/D-D/A converter 30.

In this manner each connected subscriber station generating a request for service is given a time slot as defined by the duration of the clock pulses generated by clock circuit 20 during which they have access to A/D-D/A converter 30 via an associated gate circuit and PAM bus connection 29. A/D-D/A converter 30 then converts the Pulse Amplitude Modulation (PAM) signals received from PAM bus connection 29 to Pulse Code Modulation (PCM) signals which are extended to digital trunk 40. Digital trunk 40 then inserts each 8-bit PCM signal from A/D-D/A converter 30 into one of the 24 8-bit channels defined on the T1 line. Therefore clock circuit 20 can enable a maximum of 24 subscribers stations during each T1 line time period. Data link 50 transmits these signals to unipolar/bipolar converter 60 which converts them from the unipolar format used in the digital concentrator to the bipolar format used for transmission between telephone offices.

Similarly the associated digital telephone office can transmit PCM signals to the digital concentrator which will be received by the digital trunk interface. A/D-D/A converter 30 then converts these PCM signals into PAM signals and applies them to PAM bus 29. Again PAM bus 29 must be enabled in order to transmit signals and therefore when clock circuit 20 causes memory 21 to display a line circuit address decoder 22 enables the decoded analog gate circuit (e.g. 24, 26, or 28), which transmits these signals to the connected line circuit and consequently to the connected subscriber station.

The digital concentrator makes this connection economical since it allows the number of subscriber stations connected to A T1 channel to exceed the capacity of the T1 channel based on the low probability of simultaneous requessts for service.

Rural telephone subscribers are thus provided with full feature telephone service through use of a digital concentrator connected to a remote digital telephone office.

DATA LINK

Referring now to FIG. 1b, the circuitry of Data Link 50 is shown.

Data Link 50 includes Universal Asynchronous Receiver Transmitter (UART) 51 connected to processing unit 100. UART's are old and well known. Typical examples of UART's include National Semiconductor's INS 8250, Motorola's MC 6850, Texas Instruments' TMS 6011 and Intels 8251A. Gate 53 is connected to UART 51 and digital trunk 40. Gate 52 is connected to digital trunk 40 and gate 54, which is also connected to gate 53. Gate 54 is further connected to unipolar/bipolar converter 60. Gates 55 and 56 are connected to unipolar/bipolar converter 60. Gate 55 is further connected to digital trunk 40 and gate 56 is connected to UART 51.

For the processing unit to transmit call processing signals to the telephone office, processing unit 100 transfers 8 bits of data, D0-D7, in a parallel mode, to UART 51 by executing a write command on lead 31. UART 51 will then asynchronously and sequentially apply each bit received from processing unit 100 (D0–D7) to the data out (D0) lead upon each occurrence of the FS signal from digital trunk 40. The FS signal is generated by digital trunk 40 during the 193rd bit position of each even numbered frame of 192 bits (24 channels of 8-bits each). Gate 53 then gates each D0 bit to gate 54 during each FS signal. Since gate 52 is enabled by $\overline{FS}$, it will gate all of the T1 channel signals from digital trunk 40 to gate 54 except when the FS signal occurs. Consequently gate 54 performs the "OR" function of combining the D0 signals which occur when FS is true with the T1 signals which occur when FS is not true. Thus the D0 signals are inserted in the T1 line in the FS bit position which occurs in alternate frames. Since each T1 frame has a 125 microsecond duration, the FS signal occurs every 250 microseconds and thus represents a 4 KHz channel included in the T1 channel.

Similarly for the telephone office to transmit call processing instructions to the processing unit, T1 channel signals are transmitted to Data Link 50. Gate 55 transfers all of the T1 bits to digital trunk 40 unless the FS signal is true since gate 55 is enabled by $\overline{FS}$. When the FS signal is true gate 56 gates the call processing instruction bit transmitted at that time to UART 51. Thus the call processing instruction signals are retrieved from the 4 KHz channel included in the TL line. UART 51 will sequentially store 8 of these bits, whereupon processing unit 100 can retrieve them by executing a read command on lead 31.

Data Link 30 thus facilitates communication between the processing unit and the telephone office via a 4 KHz T1 channel.

SOFTWARE OPERATIONS

The software operations of processing unit 100 are described in the flow charts of FIGS. 2–9, while the software operations of the telephone office are described in the flow charts of FIGS. 10–22.

It will be obvious to those skilled in the art that numerous modifications of the present invention can be made without departing from the spirit of the invention which shall be limited only by the scope of the claims appended hereto.

What is claimed is:

1. A digital concentrator including a plurality of line circuits operated to generate line transmit signals, said digital concentrator comprising:
selection means connected to said line circuits, operated in response to said line transmit signals from each line circuit to generate an associated periodic enable signal;
a plurality of transmit gating means connected to said plurality of line circuits, and to said selection means, each operated in response to a predetermined one of said enable signals to gate the line transmit signal from a connected line circuit for a predetermined time;
conversion means connected to said plurality of transmit gating means operated in response to each of said gated line transmit signals to generate a group of simultaneously occurring digital line transmit signals; and
a digital trunk interface connected to said conversion means operated in response to each group of simultaneously occurring digital line transmit signals to generate a group of serial digital line transmit signals, and further operated to sequentially concatenate each group of said serial digital line transmit signals, into a first serial data stream.

2. A digital concentrator as claimed in claim 1, wherein said digital concentrator is connected to a digital telephone office operated to generate a second serial data stream including a plurality of groups of serial digital line receive signals;
said digital trunk interface further operated in response to said second serial data stream to sequentially generate a plurality of groups of simultaneously occurring digital line receive signals;
said conversion means further operated in response to each of said groups of simultaneously occurring digital line receive signals to generate an analog line receive signal; and
a plurality of receive gating means connected to said plurality of line circuits, said conversion means and said selection means, each operated in response to a predetermined one of said enable signals to gate each of said line receive signals to a predetermined line circuit.

3. A digital concentrator as claimed in claim 2, wherein said selection means comprise:
a processing unit connected to said line circuits and to said digital trunk interface;
a memory connected to said processing unit;
said processing unit operated in response to said line transmit signals from each line circuit to generate a line circuit address signal;
said digital trunk interface further operated in response to said line circuit address signal to insert each bit of said line circuit address signal in a predetermined bit position of said first serial data stream;
said telephone office further operated in response to said line circuit address bits to generate a memory address signal and insert each bit of said memory address signal in a predetermined bit position of said second serial data stream;
said digital trunk interface further operated in response to said memory address bits to retrieve said memory address signal; and
said processing unit further operated to response to said retrieved memory address signal to store said line circuit address signal in said memory at a location represented by said retrieved memory address signal.

4. A digital concentrator as claimed in claim 3, wherein said selection means further comprise:
a clock circuit operated to generate periodic clock pulses;
said memory further connected to said clock circuit, operated in response to each successive clock pulse to display the line circuit address contained in each successive memory location; and
a decoder connected to said memory operated in response to each of said displayed line circuit addresses to generate said line circuit enable signal.

5. A digital concentrator as claimed in claim 1, wherein said conversion means comprises an A/D-D/A converter.

6. A digital concentrator as claimed in claim 1, wherein each of said transmit gating means comprises:
a sample and hold circuit connected to an associated line circuit, operated to sample and hold the line transmit signals from the connected line circuit for a predetermined time; and
an analog gating circuit, connected to an associated sample and hold circuit, operated in response to said predetermined one of said enable signals to gate the line transmit signal from the connected line circuit to said conversion means.

* * * * *